US008962823B2

(12) United States Patent
Cordova et al.

(10) Patent No.: US 8,962,823 B2
(45) Date of Patent: Feb. 24, 2015

(54) HETEROGENEOUS THIOL-ENE CLICK MODIFICATIONS OF SOLID POLYSACCHARIDE-BASED MATERIALS

(75) Inventors: Armando Cordova, Stockholm (SE); Jonas Hafren, Stockholm (SE)

(73) Assignee: Organoclick AB, Stockholm (SE)

( * ) Notice: Subject to any disclaimer, the term of this patent is extended or adjusted under 35 U.S.C. 154(b) by 215 days.

(21) Appl. No.: 13/522,067

(22) PCT Filed: Jan. 19, 2011

(86) PCT No.: PCT/SE2011/050058
§ 371 (c)(1),
(2), (4) Date: Jul. 13, 2012

(87) PCT Pub. No.: WO2011/090428
PCT Pub. Date: Jul. 28, 2011

(65) Prior Publication Data
US 2012/0330002 A1    Dec. 27, 2012

Related U.S. Application Data

(60) Provisional application No. 61/296,161, filed on Jan. 19, 2010.

(51) Int. Cl.
| | | |
|---|---|---|
| *C08B 3/10* | (2006.01) | |
| *C08B 3/16* | (2006.01) | |
| *C08B 3/20* | (2006.01) | |
| *C08B 3/14* | (2006.01) | |
| *C08B 11/08* | (2006.01) | |
| *D06M 13/03* | (2006.01) | |
| *D06M 13/252* | (2006.01) | |

(52) U.S. Cl.
CPC ... *C08B 3/20* (2013.01); *C08B 3/14* (2013.01); *C08B 11/08* (2013.01); *D06M 13/03* (2013.01); *D06M 13/252* (2013.01)
USPC .............. 536/92; 536/120; 536/122; 536/124

(58) Field of Classification Search
CPC ................................ C08B 11/08; C08B 31/08
See application file for complete search history.

(56) References Cited

U.S. PATENT DOCUMENTS

| | | | |
|---|---|---|---|
| 5,789,578 | A | 8/1998 | Burton et al. |
| 6,063,914 | A | 5/2000 | Wolf et al. |
| 2003/0044468 | A1 | 3/2003 | Cellesi et al. |
| 2003/0144373 | A1 | 7/2003 | Bowman et al. |
| 2010/0215748 | A1 | 8/2010 | Ladet et al. |

FOREIGN PATENT DOCUMENTS

| | | |
|---|---|---|
| AU | 200032204 B2 | 6/2004 |
| CA | 2 672 019 | 6/2008 |
| WO | 2006/068611 A1 | 6/2006 |

OTHER PUBLICATIONS

Zhao et al., "Heterogeneous "Organoclick" Derivatization of Polysaccarides: Photochemical Thiol-ene click Modification of Solid Cellulose", Macromolecular Rapid Communications, vol. 31, No. 8, Apr. 20, 2013, pp. 740-744.
Fiore et al., "Photoinduced Thiol-Ene Coupling as a Click Ligation Tool for Thiodisaccharide Synthesis", The Journal of Organic Chemistry, vol. 74, No. 11, Jun. 5, 2009, pp. 4422-4425.
Extended European Search Report in corresponding European Application No. 11734939.9 dated Oct. 15, 2013.
J. Jagur-Grodzinski, "Heterogeneous modification of polymers", J. Wiley & Sons, New York 1997, p. 64.
R. D. Gilbert, J. F. Kadla, "Polysaccharides-Cellulose", in: Biopolymers from renewable resources, D. L. Kaplan, Eds., Springer Verlag, New York 1998, p. 47.
A. Córdova, J. Hafrén, Nordic Pulp Paper Res. J. 2005, 20, 477.
J. Hafrén, A. Córdova, Nordic Pulp Paper Res. J. 2007, 22, 184.
P. Wu, A. K. Feldman, A. K. Nugent, C. J. Hawker, A. Scheel, B. Voit, J. Pyun, J. M. J. Frechet, K. B. Sharpless, V. V. Fokin, Angew. Chem. Int. Ed. 2004, 43, 3863.
C. N. Salinas, B. B. Cole, A. M. Kasko, K. S. Anseth, Tissue Eng. 2007, 13, 1025.
International Search Report for corresponding International Application No. PCT/SE2011/050058 mailed Apr. 13, 2011.
International Preliminary Report on Patentability for corresponding International Application No. PCT/SE2011/050058 mailed Apr. 27, 2012.
Yamaguchi et al.; "Polysaccharide-Poly(ethylene glycol) Star Copolymer as a Scaffold for the Production of Bioactive Hydrogels"; Biomacromolecules; vol. 6, No. 4, 2005, pp. 1921-1930.
Klemm et al.; "Cellulose: Fascinating Biopolymer and Sustainable Raw Material"; Angew. Chem. Int. Ed.; vol. 44, 2005, pp. 3358-3393.
Rydholm et al.; "Degradable thiol-acrylate photopolymers: polymerization and degradation behavior of an in situ forming biomaterial"; Biomaterials; vol. 26; 2005; pp. 4495-4506.
Hoyle et al.; "Thiol-Enes: Chemistry of the Past with Promise for the Future"; Journal of Polymer Science; Part A: Polymer Chemistry; vol. 42, 2004, pp. 5301-5338.
Nilsson et al; "Synthesis and Thiol-Ene Photopolmerization of Allyl-Ether Functionalized Dendrimers"; Journal of Polymer Science, Part A: Polymer Chemistry; vol. 46, 2008, pp. 1339-1348.
Tornoe et al.; "Peptidotriazoles on Solid Phase: [1,2,3]-Triazoles by Regiospecific Copper(I)-Catalyzed 1,3-Dipolar Cycloadditions of Terminal Alkynes to Azides"; J. Org. Chem., vol. 67, 2002, pp. 3057-3064.

(Continued)

*Primary Examiner* — Layla Bland
(74) *Attorney, Agent, or Firm* — Renner, Otto, Boisselle & Sklar, LLP

(57) ABSTRACT

This invention concerns the first environmentally benign heterogeneous modification of polysaccharide-based material in native solid state by thiol-ene "click chemistry". The direct reaction of a thiol with an un-activated double or triple bond by thiol-ene and thiol-enyne click modification is thermally or photochemically catalyzed and is completely metal-free and allows for a highly modular approach to modifications of fibers and fiber-based materials.

12 Claims, 1 Drawing Sheet

(56) References Cited

OTHER PUBLICATIONS

Ramachary et al.; "Towards Organo-Click Chemistry: Development of Organocatalytic Multicomponent Reactions Through Combinations of Aldol, Wittig, Knoevenagel, Michael, Diels-Alder and Huisgen Cycloaddition Reactions"; Chem. Eur. J.; vol. 10, 2004, pp. 5323-5331.

Kolb et al.; "Click Chemistry: Diverse Chemical Function from a Few Good Reactions"; *Agnew. Chem. Int. Ed.*; vol. 40, 2001, pp. 2004-2021.

Carioscia et al.; "Thiol-ene oligomers as dental restorative materials"; Dental Materials; vol. 21, 2005, pp. 1137-1143.

Carioscia et al.; "Thiol-Norbornene Materials: Approaches to Develop High $T_g$ Thiol-Ene Polymers"; Journal of Polymer Science, Part A: Polymer Chemistry; vol. 45, 2007, pp. 5686-5696.

Hafrén et al.; "Direct Organocatalytic Polymerization from Cellulose Fibers$^a$"; Macromol. Rapid Commun.; vol. 26, 2005, pp. 82-86.

Hafrén et al.; "Heterogeneous 'Organoclick' Derivatization of Polysaccharides$^a$"; Macromol. Rapid Commun.; vol. 27, 2006, pp. 1362-1366.

Huang et al.; "Biomolecular Modification of Hierarchical Cellulose Fibers through Titania Nanocoating"; Angew. Chem. Int. Ed.; vol. 45, 2006, pp. 2883-2886.

Huang et al.; "Nano-precision Replication of Natural Cellulosic Substances by Metal Oxides"; J. Am. Chem. Soc.; vol. 125, 2003, pp. 11834-11835.

Killops et al.; "Robust, Efficient, and Orthogonal Synthesis of Dendrimers via Thiol-ene "Click" Chemistry"; J. Am. Chem.; vol. 130, 2008, pp. 5062-5064.

Campos et al.; "Development of Thermal and Photochemical Strategies for Thiol-Ene Click Polymer Functionalization"; Macromolecules, vol. 41, 2008, pp. 7063-7070.

Wu et al.; "Efficiency and Fidelity in a Click-Chemistry Route to Triazole Dendrimers by the Copper(I)-Catalyzed Ligation of Azides and Alkynes"; Angew. Chem. Int. Ed.; vol. 43, 2004, pp. 3892-3932.

Li et al.; "Thiourethane-Based Thiol-Ene High $T_g$ Networks: Preparation, Thermal, Mechanical, and Physical Properties"; *Journal of Polymer Science; Part A: Polymer Chemistry*; vol. 45, 2007, pp. 5103-5111.

Caruso; "Micrometer-to-Nanometer Replication of Hierarchical Structures by Using a Surface Sol-Gel Process"; Angew Chem. Int. Ed.; vol. 43, 2004, pp. 2746-2748.

Punna et al.; "'Clickable' Agarose for Affinity Chromatography"; Bioconjugate Chem.; vol. 16, 2005, pp. 1536-1541.

Liebert et al.; "Click Chemistry with Polysaccharides"; Macromolecular Rapid Communications; vol. 27, 2006, pp. 208-213.

Liebert et al.; "Nanoparticles on the Basis of Highly Functionalized Dextrans"; J. Am. Chem. Soc.; vol. 127, 2005, p. 10484-10485.

Lewis et al.; "Click Chemistry in Situ: Acetylcholinesterase as a Reaction Vessel for the Selective Assembly of a Femtomolar Inhibitor from an Array of Building Blocks"; Angew. Chem. Int. Ed.; vol. 41, No. 6, 2002, pp. 1053-1057.

Rostovsev et al.; "A Stepwise Huisgen Cycloaddition Process: Copper (I)-Catalyzed Regioselective 'Ligation' of Azides and Terminal Alkynes"; Angew. Chem. Int. Ed.; vol. 41, No. 14, 2002, pp. 2596-2599.

HETEROGENEOUS THIOL-ENE CLICK MODIFICATIONS OF SOLID POLYSACCHARIDE-BASED MATERIALS

This application is a national phase of International Application No. PCT/SE2011/050058 filed Jan. 19, 2011 and published in the English language, which claims priority to U.S. 61/296,161 filed Jan. 19, 2010.

FIELD OF INVENTION

The present invention relates to a highly modular method for heterogeneous modification of polysaccharide-based materials in native solid state by the reaction between a sulfide and an alkene or an alkyne.

BACKGROUND

The development of polymeric materials with tailored surface properties plays an important role in today's society. Essential all devices and carriers contain different materials that have to be compatible with their surroundings. In addition, there is a need to develop chemistry that is based on renewable resources. Polysaccharides are a natural and renewable resource and a desirable raw material for sustainable chemistry applications. Chemical modifications of polysaccharides are often an important step to change its chemistry or structure in order to design properties needed for specific applications.[1,2] Esterification and etherification are among the most commonly used derivatizations of polysaccharides. There is much use of, and many reports on, efficient and homogenous derivatization of dissolved polysaccharides, but less on solid polysaccharides, such as cellulose. There are different technically viable approaches for cellulose modifications using, for example, acid chlorides, anhydrides and heavy metal based catalyst or nucleophilic substitutions. However, direct, inexpensive, technically simple, environmentally friendly and modular modifications of solid carbohydrates are of great interest to many industries utilizing natural fibers, but it is a challenging task due to the low reactivity of the solid surface of native cellulose and polysaccharide-based materials.[3] So called "Click" chemistry,[5] (copper(I)-catalyzed Huisgen 1,3-dipolar cycloaddition between azides and terminal alkynes)[6] have been applied to polysaccharides and allow for chemoselective and highly modular route to cellulose modifications.[7,8] The reaction of a thiol with an un-activated double bond has been used in various applications to crosslink polymers and has recently emerged as a new thiol-ene based "click" chemistry coupling reaction providing for chemo-selective bio-conjugations and polymerizations.[9-11] The thiol-ene "click" reaction does not require the need for a metal catalyst as compared with for example the copper(I)-mediated azide/alkyne click chemistry. Thiol-ene coupling also benefits from that it can be activated both thermally or photochemically and, depending on substrates, performed without solvents allowing for green and efficient reaction conditions.[12]

This invention provides the first example of the environmentally benign heterogeneous modification of polysaccharide-based materials in its native solid state by thiol-ene "click chemistry". This "organoclick" methodology is highly modular and completely metal-free.

OBJECT OF THE INVENTION

It is an object of the invention to provide a highly modular method for the heterogeneous modification of polysaccharide-based materials (plant material or plant derived-fibers, solid-(ligno)cellulose, hemicellulose, starch or any solid state polysaccharide-containing polymer alone or within a matrix) in native solid state by the reaction of a thiol with a double or triple bond by thiol-ene and thiol-enyne click modification.

Another object of the invention is to provide a highly modular method for the heterogeneous modification of polysaccharide-based materials comprising or substantially consisting of cellulose fiber in native solid state by the reaction of a thiol with a double or triple bond by thiol-ene and thiol-enyne click modification.

Another object of the invention is to attach a small molecule (e.g. fluorophores, UV active molecules, drug, amino acid, catalyst) by the method of the invention.

An additional object is to attach a large molecule (e.g. polymer, peptide, polymer) by the method of the invention.

A still further object of the method is to provide a method of the aforementioned kind that is advantageous from an environmental and health standpoint.

Even more objectives will become evident from a study of the summary of the invention, a number of preferred embodiments illustrated in a drawing, and the appended claims.

DESCRIPTION OF THE SCHEMES AND FIGURES

Scheme 1 is a picture illustrating the "thiol-ene" reaction or "thiol-enyne" reaction between a heterogeneous polysaccharide with thiol groups and an alkene or an alkyne, respectively.

Scheme 2 is a picture illustrating the "thiol-ene" reaction or "thiol-enyne" reaction between a heterogeneous polysaccharide with alkene or alkyne groups with a thiol, respectively.

Scheme 3 is a picture illustrating examples of molecules that were attached to cellulose modified with alkenes.

SUMMARY OF THE INVENTION

Figure 1:
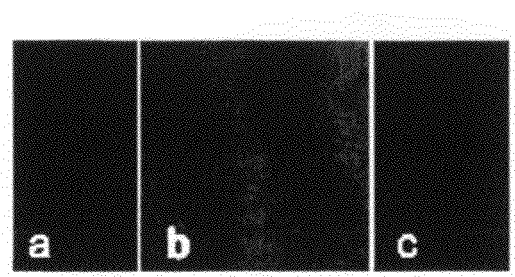
FIG. 1 shows the fluorescence of cellulose 2a, cellulose 4aa and cellulose were the fluorescent molecule has been removed by hydrolysis.

The invention is based on the use of heat or light as activation agents for the conjunction of a solid polysaccharide-based material carrying a terminal thiol-group with another molecule (monomer, oligomer or polymer) containing a terminal unsaturated double or triple bond via a thiol-ene click-chemistry type reaction. And the reverse case also apply, with a solid polysaccharide-based material carrying an alkene or alkyne hydrocarbon bond reacting with a molecule (monomer, oligomer, protein, biotine, peptide, amino acid, small molecule, drug or polymer) containing a terminal thiol-group via a thiol-ene click-chemistry type reaction.

One aspect of the invention is that a solid polysaccharide-based material ((plant material or plant derived-fibers, solid-(ligno)cellulose, hemicellulose, starch or any solid state polysaccharide-containing polymer alone or within a matrix)) with a terminal thiol group reacts with another molecule (monomer, oligomer or polymer) carrying a terminal unsaturated (double or triple) hydrocarbon bond using either photon irradiation or heat, or in combination, as catalyst obtaining the corresponding thiol-ene linked modified products (according to Scheme 1).

Scheme 1.

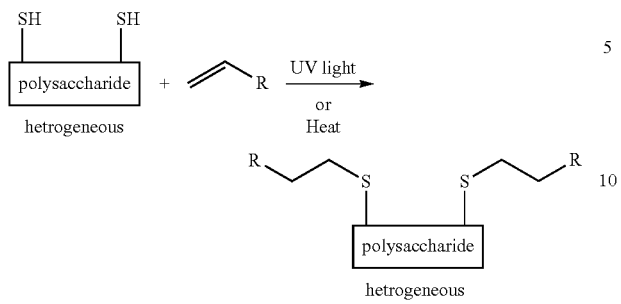

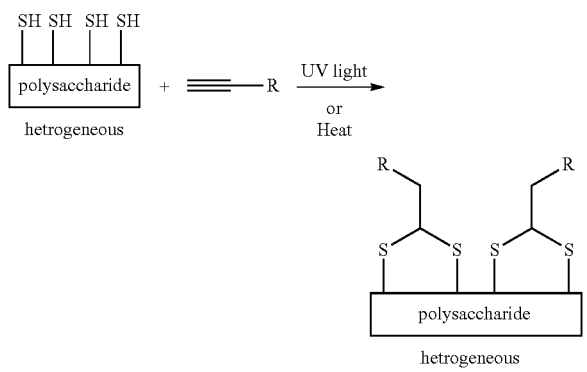

Another aspect of the invention is that a solid polysaccharide-based material ((plant material or plant derived-fibers, solid-(ligno)cellulose, hemicellulose, starch or any solid state polysaccharide-containing polymer alone or within a matrix)) with a terminal unsaturated (double or triple) hydrocarbon bond reacts with another molecule (monomer, oligomer or polymer) carrying terminal thiol group using either photon irradiation or heat, or in combination, as catalyst obtaining the corresponding thiol-ene linked modified products (according to Scheme 2).

Scheme 2.

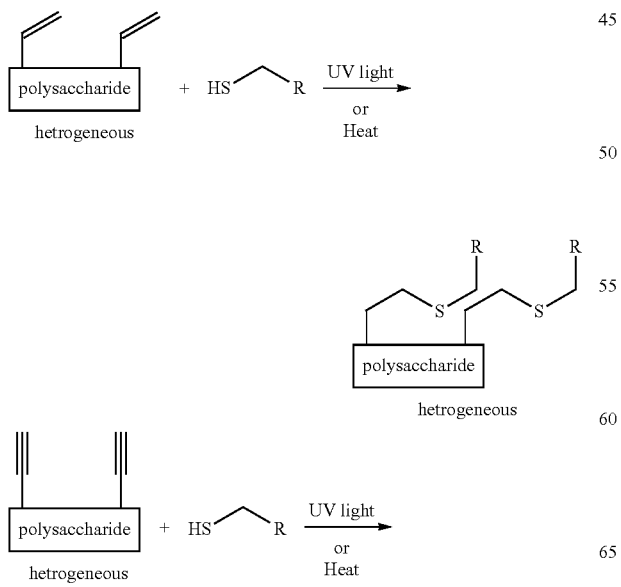

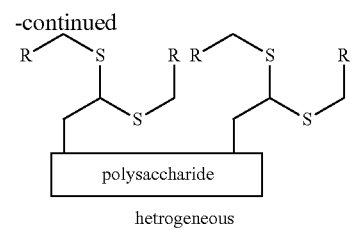

Another aspect of the invention is that all the previously described transformations can be and are performed with an enantiomerically pure reactants yielding enantiomerically pure products.

Another aspect of the invention is that polysaccharide-based fiber material initially without thiol- or olefinic groups may be substituted with an terminal thiol- or olefinic containing molecule by organocatalytic derivatization of polysaccharide-based fiber material using small organic acids as catalysts according a previous patent (International Patent WO 2006068611 A1 20060629 "Direct Homogeneous and Heterogeneous Organic Acid and Amino Acid-Catalyzed Modification of Amines and Alcohols"). Thereby, a completely metal-free, environmentally friendly and highly modular modification of any solid polysaccharide-based fibrous material may be achieved.

Another aspect of the invention is that polysaccharide-based fiber material initially without olefinic groups may be substituted with a terminal olefinic containing molecule by derivatization of polysaccharide-based fiber material using acrylic and methacrylic anhydrides with or without a nucleophilic catalyst. Thereby, a completely metal-free, environmentally friendly and highly modular modification of any solid polysaccharide-based fibrous material may be achieved.

The method of the invention is composed of two steps in which the heterogeneous polysaccharide is modified under environmentally benign conditions. In one embodiment of the invention the method comprises the steps of:
  i) Providing a heterogeneous polysaccharide
  ii) Chemically modify said polysaccharide with a molecule containing an alkene or alkyne group by a suitable modification method.
  iii) To the alkene or alkyne group on the modified heterogeneous polysaccharide attach a thiol-containing functional molecule by using thiol-ene and thiol-enyne click modification, respectively, using UV irradiation, heat or a Michael conjugate addition.

In another embodiment of the invention the method comprises the steps of:
  i) Providing a heterogeneous polysaccharide
  ii) Chemically modify said polysaccharide with a molecule containing a thiol group by a suitable modification method.
  iii) To the thiol group on the modified heterogeneous polysaccharide attach an alkene- or alkyne-containing functional molecule by using thiol-ene and thiol-enyne click modification, respectively, using UV irradiation, heat or a Michael conjugate addition.

Suitable reactive molecules that may be used in order to attach the alkene, alkyne, or thiol group to the heterogeneous polysaccharide in the second step of the invention include acids, alkyl ketene dimmers, acid chlorides, epoxides, akoxysilanes, chlorosilanes, anhydrides, or other reactive molecules containing the alkene, alkyne or thiol functionality. The modification may be performed in a water based solution, in an organic solvent or neat. The modification may be performed with or without a catalyst. Suitable catalysts, depending on the nature of the reactive molecule, may be an acid catalyst, or a nucleophilic catalyst. The nature of the catalyst for the specific reactive molecule may be determined by a person skilled in the art.

In the third step of the invention, a thiol-, alkene-, or alkyne-containing molecule is linked to the previously attached thiol, alkene- or alkyne containing molecule used in step two of the invention by thiol-ene and thiol-enyne click modification, respectively, using UV irradiation, heat or a Michael conjugate addition as previously described.

Heterogeneous polysaccharides modified by using the method of the invention may be for example modified cellulosic fibres, modified starches, or modified hemicelluloses. The materials may be polymers or individual fibres, but may also be in form or a matrix or web such as for example a paper based material, cotton based textile, nonwoven textile, or wood based material, such as for example particle board, MDF-board, or solid wood.

DETAILED DESCRIPTION

Thiol-Ene Click Derivatization of Cellulose

To a solution of a thiol ((with 2,2-dimethoxy-2-phenylacetophenone (DMPA) (1 wt %)) around 30 mg cellulose (containing terminal olefinic groups) was added (see Scheme 3). Then the reaction was irradiated with a UV lamp (UV-B bulb, TL20W/12, 20 W) for 1 h. After that, the cellulose was taken out and purified by soxhlet extraction. After drying the thiol-ene click modified cellulose was obtained. The cellulose was modified with polyesters, aliphatic and aryl groups. The cellulose was also modified with the amino acid cystein.

Sample Analyses

The cellulose samples derivatized by polyesters or hydrocarbons were analyzed using FT-IR, directly without further sample handling, using a Perkin-Elmer Spectrum One FT-IR spectrophotometer. Each sample was subject to 32 averaged scans. Fluorescence of benzyl-derivatized cellulose samples were analyzed using a Leica fluorescence microscope with an excitation/emission filter cub (filter cub A); excitation ($\lambda_{ex}$)=340-380 nm and emission ($\lambda_{ex}$)=>425 nm using 10× objective lens.

Scheme 3.

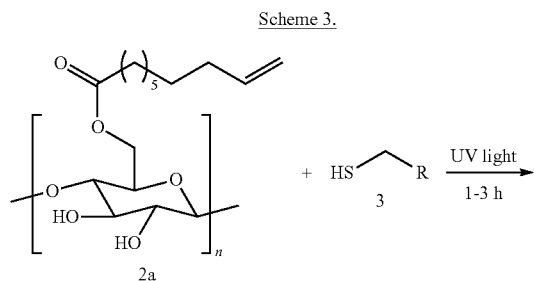

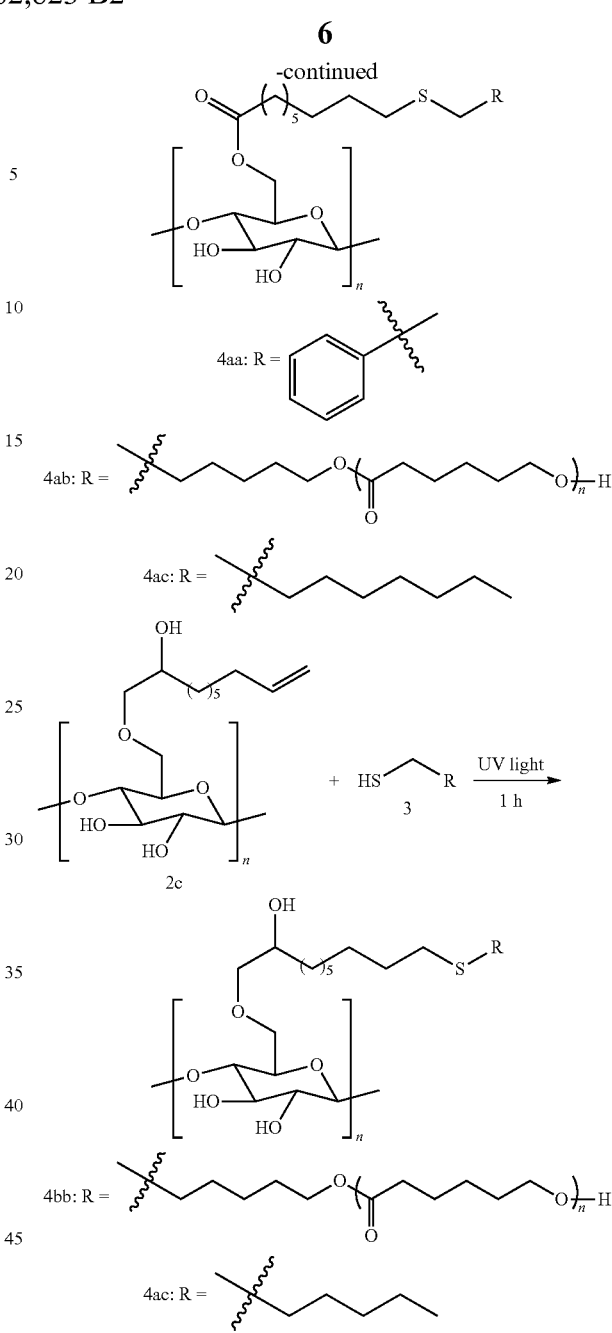

The present invention will now be described by reference to a number of preferred embodiments illustrated in the following Examples.

EXAMPLE 1

The filter paper (around 30 mg) was dipped into a mixture of 9-decenoic acid (1 g) and
(S)-tartaric acid (5 mol %). Then the reaction was heated to 110° C. and kept for 8 hours. After that, the filter paper was taken out and extracted by soxhlet. After drying the modified filter paper 2a (Scheme 3) was obtained.

EXAMPLE 2

The filter paper (around 30 mg) was dipped into a mixture of hex-5-ynoic acid (1 g) and (S)-tartaric acid (5 mol %). Then the reaction was heated to 110° C. and kept for 8 hours. After that, the filter paper was taken out and extracted by soxhlet. After drying the modified filter paper 2b was obtained.

EXAMPLE 3

The filter paper (around 30 mg) was dipped into a mixture of 2-(oct-7-enyl)oxirane (1 g) and (S)-tartaric acid (5 mol %). Then the reaction was heated to 110° C. and kept for 1 hour. After that, the filter paper was taken out and extracted by soxhlet. After drying the modified filter paper 2c (Scheme 3) was obtained.

EXAMPLE 4

To a mixture of the 9-decenoic acid (340 mg, 2 mmol) and octane-1-thiol (292 mg, 2 mmol) was added 2,2-dimethoxy-2-phenylacetophenone (DMPA) (1 wt %). Then the reaction mixture was irradiated with UV lamp (UV-B bulb, TL20W/12, 20 W) for 1 h. The product was formed as a white solid and checked by $^1$H NMR. 10-(Octylthio)decanoic acid: $^1$H NMR (400 MHz, CDCl3) δ 2.51 (t, J=6.0 Hz, 4H), 2.36 (t, J=6.0 Hz, 2H), 1.66-1.56 (m, 6H), 1.38-1.29 (m, 20H), 0.89 (t, J=5.6 Hz, 3H); $^{13}$C NMR (100 MHz, CDCl3) δ 180.6, 34.2, 32.3, 32.2, 31.9, 29.82, 29.78, 29.4, 29.32, 29.29, 29.13, 29.08, 29.0, 28.5, 24.7, 22.8, 14.2.

EXAMPLE 5

To a solution of the benzylthiol with 2,2-dimethoxy-2-phenylacetophenone (DMPA) (1 wt %) the modified cellulose 2a (around 30 mg) was added. Then the reaction was irradiated with a UV lamp (UV-B bulb, TL20W/12, 20 W) for 1 h. After that, the cellulose was taken out and purified by soxhlet. After drying the modified cellulose 4aa was obtained. The cellulose 4aa exhibited fluorescence, which is in agreement with the attachment of the benzyl thiol to the cellulose FIG. 1.

FIG. 1. The fluorescence of 9-decenoic acid modified cellulose 2a (a), fluorescent-labeled cellulose 4aa (b), and sample 4aa after deesterification (NaOH) and subsequent extraction to remove the released molecules (c).

EXAMPLE 6

To a bulk solution of the polymer (poly(ε-caprolactone (PCL)) with a thiol end-group and 2,2-dimethoxy-2-phenylacetophenone (DMPA) (1 wt %) the modified cellulose 2a (around 30 mg) was added. Then the reaction was irradiated with a UV lamp (UV-B bulb, TL20W/12, 20 W) for 1 h. After that, the cellulose was taken out and purified by soxhlet. After drying the polymer-modified cellulose 4ab was obtained. The cellulose 4ab was analyzed by IR (FIG. 2).

Figure 2:
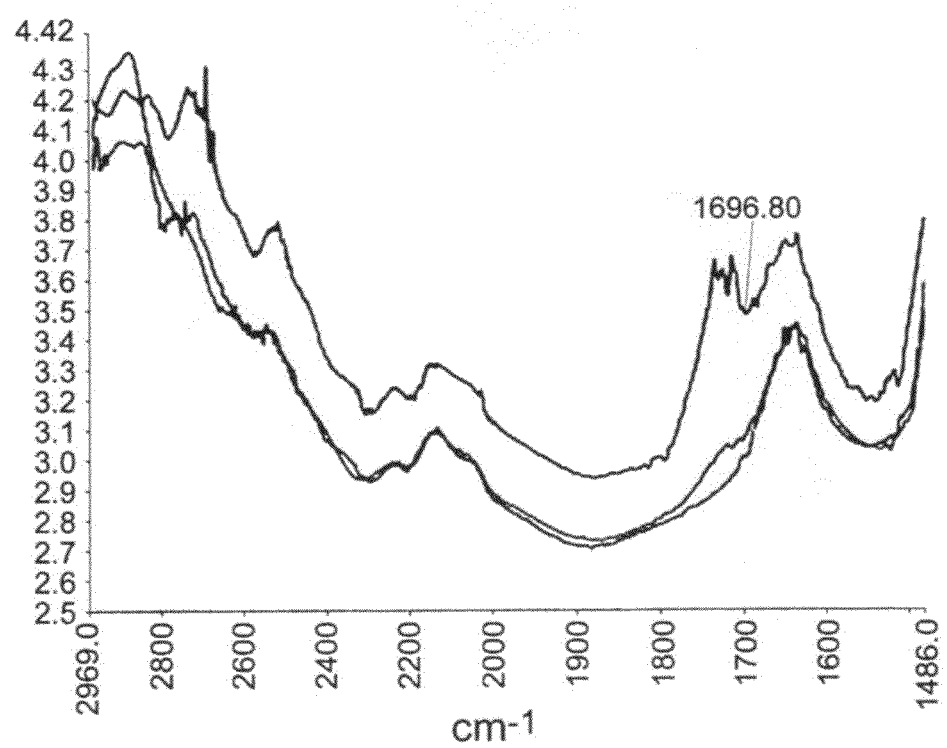
FIG. 2 shows the IR spectra of cellulose (blank), cellulose 2a and cellulose 4ab.

FIG. 2. FT-IR spectra: the top line is the IR of the modified cellulose 4ab, the middle one is the IR spectrum of 2a, the lowest line is the IR of the blank. The ester carbonyl (C=O) absorbs at 1730 cm$^{-1}$.

EXAMPLE 7

To a solution of the octane thiol with 2,2-dimethoxy-2-phenylacetophenone (DMPA) (1 wt %) the modified cellulose 2a (around 30 mg) was added. Then the reaction was irradiated with a UV lamp (UV-B bulb, TL20W/12, 20 W) for 1 h. After that, the cellulose was taken out and purified by soxhlet. After drying the modified cellulose 4ac was obtained.

EXAMPLE 8

To a solution of the benzylthiol with 2,2-dimethoxy-2-phenylacetophenone (DMPA) (1 wt %) the modified cellulose 2c (around 30 mg) was added. Then the reaction was irradiated with a UV lamp (UV-B bulb, TL20W/12, 20 W) for 1 h. After that, the cellulose was taken out and purified by soxhlet. After drying the modified cellulose was obtained. The cellulose exhibited fluorescence, which is in agreement with the attachment of the benzyl thiol.

EXAMPLE 9

To a bulk solution of the polymer (poly(ε-caprolactone (PCL)) with a thiol end-group and 2,2-dimethoxy-2-phenylacetophenone (DMPA) (1 wt %) the modified cellulose 2c (around 30 mg) was added. Then the reaction was irradiated with a UV lamp (UV-B bulb, TL20W/12, 20 W) for 1 h. After that, the cellulose was taken out and purified by soxhlet. After drying the polymer-modified cellulose 4bb was obtained.

EXAMPLE 10

To a solution of the octane thiol with 2,2-dimethoxy-2-phenylacetophenone (DMPA) (1 wt %) the modified cellulose 2c (around 30 mg) was added. Then the reaction was irradiated with a UV lamp (UV-B bulb, TL20W/12, 20 W) for 1 h. After that, the cellulose was taken out and purified by soxhlet. After drying the modified cellulose 4bc was obtained.

EXAMPLE 11

To a bulk solution of the polymer (poly(ε-caprolactone (PCL)) with a thiol end-group and 2,2-dimethoxy-2-phenylacetophenone (DMPA) (1 wt %) the modified cellulose 2c (around 30 mg) was added. Then the reaction was heated at 80° C. for 16 h. After that, the cellulose was taken out and purified by soxhlet. After drying the polymer-modified cellulose 4bb was obtained.

EXAMPLE 12

To a bulk solution of the polymer (poly(ε-caprolactone (PCL)) with a thiol end-group and 2,2-dimethoxy-2-phenylacetophenone (DMPA) (1 wt %) the modified cellulose 2b (around 30 mg) was added. Then the reaction was irradiated with a UV lamp (UV-B bulb, TL20W/12, 20 W) for 1 h. After that, the cellulose was taken out and purified by soxhlet. After drying the polymer-modified cellulose 4cc was obtained.

REFERENCES

[1] D. K. Klemm, B. Heublein, H. P. Fink, A. Bohn, *Angew. Chem. Int. Ed.* 2005, 44, 3358 and references therein.

[2] [2a] J. Huang, I. Ichinose, T. Kunitake, *Angew. Chem. Int. Ed.* 2006, 118, 2949; [2b] R. A. Caruso, *Angew. Chem., Int. Ed. Ed.* 2004, 43, 2746; [2c] J. Huang, T. Kunitake, *J. Am. Chem. Soc.* 2003, 125, 11834; [dc] T. Liebert, S. Hornig, S. Hesse, T. Heinze, *J. Am. Chem. Soc.* 2005, 127, 10484.

[3] [3a] J. Jagur-Grodzinski, "Heterogeneous modification of polymers", J. Wiley & Sons, New York 1997, p. 64; [3b] R. D. Gilbert, J. F. Kadla, "Polysaccharides-Cellulose", in: Biopolymers from renewable resources, D. L. Kaplan, Eds., Springer Verlag, New York 1998, p. 47.

[4] [4a] J. Hafrén, A. Córdova, *Macromol. Rapid Commun.* 2005, 26, 82; [4b] A. Córdova, J. Hafrén, *Nordic Pulp*

Paper Res. J. 2005, 20, 477; [4c] J. Hafrén, A. Córdova, Nordic Pulp Paper Res. J. 2007, 22, 184.
[5] H. C. Kolb, M. G. Finn, K. B. Sharpless, *Angew. Chem. Int. Ed.* 2001, 40, 2004.
[6] [6a] V. V. Rostovsev, L. G. Green, V. V. Fokin, K. B. Sharpless, *Angew. Chem. Int. Ed.* 2002, 41, 2596; [6b] W. G. Lewis, L. G. Green, F. Grynszpan, Z. Radic, P. R. Carlier, P. Taylor, M. G. Green, V. V. Fokin, K. B. Sharpless, *Angew. Chem. Int. Ed.* 2002, 41, 1053; [6c] S. Punna, E. Kaltgrad, M. G. Finn, *Bioconjugate Chem.* 2005, 16, 1536; [6d] P. Wu, A. K. Feldman, A. K Nugent, C. J. Hawker, A. Scheel, B. Voit, J. Pyun, J. M. J. Frechet, K. B. Sharpless, V. V. Fokin, *Angew. Chem. Int. Ed.* 2004, 43, 3863; [6e] D. B. Ramachary, C. F. Barbas III, *Chem. Eur. J.* 2004, 10, 5323; [6f] C. W. Tornoe, C. Christensen, M. Meldal, *J. Org. Chem.* 2002, 67, 3057.
[7] T. Liebert, C. Hänsch, T. Heinze, *Macromol. Rapid Commun.* 2006, 27, 208.
[8] J. Hafrén, W. Zou, A. Córdova, *Macromol. Rapid Commun.* 2006, 27, 1362.
[9] [9a] C. E. Hoyle, T. Y. Lee, T. Roger, *J. Polym. Sci. Part A: Polym. Chem.* 2004, 42, 5301; [9b] J. A. Carioscia, L. Schneidewind, C. O'Brien, R. Ely, C. Feeser, N. Cramer, C. N. Bowman, *J. Polym. Sci. Part A: Polym. Chem.* 2007, 45, 5686; [9c] Q. Li, H. Zhou, D. A. Wicks, C. E. Hoyle, *J. Polym. Sci. Part A: Polym. Chem.* 2007, 45, 5103.
[10] [10a] J. A. Carioscia, H. Lu, J. W. Stanbury, C. N. Bowman, *Dent. Mater.* 2005, 21, 1137; [10b] C. N. Salinas, B. B. Cole, A. M. Kasko, K. S. Anseth, *Tissue Eng.* 2007, 13, 1025. [10c] A. E. Rydholm, C. N. Bowman, K. S. Anseth, *Biomaterials* 2005, 26, 4495.
[11] [11a] P. Wu, A. K. Feldman, A. K. Nugent, C. J. Hawker, A. Scheel, B. Voit, J. Pyun, J. M. J. Fréchet, K. B. Sharpless, V. V. Fokin, *Angew. Chem. Int. Ed.* 2004, 43, 3928; [11b] C. Nilsson, N. Simpson, M. Malkoch, M. Johansson, E. Malmström, *J. Polym. Sci Part A: Polym. Chem.* 2008, 46, 1339.
[12] [12a] K. L. Killops, L. M. Campos, C. J. Hawker, *J. Am. Chem. Soc.* 2008, 130, 5062; [12b] L. M. Campbs, K. L. Killops, R. Sakai, J. M. J. Paulesse, D. Damiron, E. Drockenmuller, B. W. Messmore, C. J. Hawker, *Macromol.* 2008, 41, 7063.

The invention claimed is:
1. A method for the heterogeneous modification of solid polysaccharide-based material comprising the steps of
  (ia) providing a solid polysaccharide-based material with terminal thiol-groups whereby an acid or a nucleophilic catalyst is used to obtain said solid polysaccharide-based material with terminal thiol-groups; and
  (iia) bringing said terminal thiol-groups to react with a molecule containing a terminal unsaturated double or triple bond.
2. The method according to claim 1 in which the solid polysaccharide-based material with thiol-groups is provided by
  (i) providing a solid polysaccharide-based material;
  (ii) providing a modifying agent comprising thiol-groups;
  (iii) providing said acid or nucleophilic catalyst; and
  (iv) reacting the solid polysaccharide-based material with the modifying agent, in the presence of said catalyst.
3. The method according to claim 2 in which the modifying agent comprising thiol-groups is chosen from among acids, alkyl ketene dimers, acid chlorides, epoxides, alkoxysilanes, chlorosilanes, and anhydrides containing thiol functionality.
4. The method according to claim 1 in which said thiol-groups are brought to a click-chemistry type reaction with the molecule containing an unsaturated double or triple bond by using either photon irradiation or heat, or a combination thereof, as catalyst.
5. The method according to claim 1 in which said thiol-groups are brought to a click-chemistry type reaction with the molecule containing an unsaturated double or triple bond by way of Michael conjugate addition.
6. The method according to claim 1 in which said molecule containing an unsaturated double or triple bond is a molecule of a substance chosen from among dyes, fluorescent substances, polymers, amino acids, peptides, proteins, UV-active substances, biotin, antibodies, and substances containing alkyl groups.
7. The method according to claim 1 in which said molecule containing an unsaturated double or triple bond is a molecule of a substance which is provided in nano particle size or quantum dot particle size.
8. The method according to claim 2 in which said optional catalyst is an amino acid, a peptide or a derivative thereof, an oligopeptide, $H_2O$, a sulfonic acid, a tetrazole or an organic acid.
9. The method according to claim 4 in which said photon irradiation is UV irradiation.
10. The method according to claim 6 in which said alkyl groups have more than 2 carbon atoms.
11. The method according to claim 1, wherein said solid polysaccharide-based material comprises cellulosic fibers, cellulose derivatives, lignocelluloses, hemicelluloses, starches, starch derivatives, or any combination thereof.
12. The method according to claim 1, wherein said solid polysaccharide-based material consists essentially of cellulosic fibers, cellulose derivatives, lignocelluloses, hemicelluloses, starches, or starch derivatives.

* * * * *